United States Patent
Zapolsky et al.

(10) Patent No.: US 10,745,071 B2
(45) Date of Patent: Aug. 18, 2020

(54) NON-BACKDRIVABLE PASSIVE BALANCING SYSTEMS FOR SINGLE-AXLE DYNAMICALLY-BALANCED ROBOTIC DEVICES

(71) Applicant: Toyota Research Institute, Inc., Los Altos, CA (US)

(72) Inventors: Samuel Zapolsky, Los Altos, CA (US); Manuel Ahumada, Los Altos, CA (US); Arshan Poursohi, Berkley, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 227 days.

(21) Appl. No.: 15/926,783

(22) Filed: Mar. 20, 2018

(65) Prior Publication Data
US 2019/0291799 A1 Sep. 26, 2019

(51) Int. Cl.
*B62H 1/02* (2006.01)
*B62K 11/00* (2006.01)
*B62J 45/415* (2020.01)

(52) U.S. Cl.
CPC .............. *B62H 1/02* (2013.01); *B62K 11/007* (2016.11); *B62J 45/4151* (2020.02); *B62K 2202/00* (2013.01)

(58) Field of Classification Search
CPC ... B62H 1/02; B62H 1/04; B62H 1/06; B62K 11/007; B62K 2202/00
See application file for complete search history.

(56) References Cited

U.S. PATENT DOCUMENTS

| | | | | |
|---|---|---|---|---|
| 4,671,374 A | * | 6/1987 | Kouyama | B62H 1/02 180/219 |
| 6,845,999 B2 | * | 1/2005 | Royal, Sr. | B62H 1/12 280/304 |
| 6,942,053 B2 | * | 9/2005 | Hinton | B62D 61/04 180/209 |
| 7,303,038 B2 | | 12/2007 | Mathon | |
| 7,681,902 B2 | | 3/2010 | Suzuki et al. | |
| 2012/0056403 A1 | * | 3/2012 | Lian | B62H 1/12 280/304 |
| 2012/0139221 A1 | | 6/2012 | Lo | |

(Continued)

FOREIGN PATENT DOCUMENTS

| | | |
|---|---|---|
| CN | 204507098 U | 7/2015 |
| CN | 204527405 U | 8/2015 |

(Continued)

*Primary Examiner* — Tony H Winner
(74) *Attorney, Agent, or Firm* — Dinsmore & Shohl LLC

(57) ABSTRACT

A non-backdrivable passive balancing system for a single-axle dynamically balanced robotic device includes a body that includes a distal end and a proximal end, a controller module, and an actuator communicatively coupled to the controller module of the single-axle dynamically balanced robotic device. The actuator receives an engagement signal from the controller module, the engagement signal corresponding to an indication that the dynamically balanced robotic device is stationary, and the actuator causes the linkage to move the body from a disengaged position to an engaged position such that the distal end of the body contacts a ground surface and supports the dynamically balanced robotic device in a substantially upright position.

20 Claims, 8 Drawing Sheets

(56) References Cited

U.S. PATENT DOCUMENTS

| | | | |
|---|---|---|---|
| 2017/0088211 A1* | 3/2017 | Jiang | B62K 11/007 |
| 2017/0144718 A1* | 5/2017 | Tinaphong | B62K 11/007 |
| 2017/0277202 A1 | 9/2017 | Li | |
| 2018/0154965 A1* | 6/2018 | Yeo | B62H 1/02 |
| 2019/0009854 A1* | 1/2019 | Bao | B62H 7/00 |

FOREIGN PATENT DOCUMENTS

| | | |
|---|---|---|
| CN | 104608843 B | 11/2015 |
| KR | 20120043202 A | 7/2015 |

\* cited by examiner

NON-BACKDRIVABLE PASSIVE BALANCING SYSTEMS FOR SINGLE-AXLE DYNAMICALLY-BALANCED ROBOTIC DEVICES

TECHNICAL FIELD

The present specification generally relates to passive balancing systems for dynamically balanced robots and other devices and, more specifically, to actuator-engaged non-backdrivable passive balancing systems for single-axle dynamically balanced robotic devices.

BACKGROUND

Dynamically balanced (also referred to as "self-balanced") robots and other devices may have a single primary axle and may utilize one or more gyroscopes, accelerometers, motors, and/or the like to remain upright and balanced when in a stationary position. As such, the only portions of the robot or device that contact the ground are one or more wheels coupled to the primary axle. The gyroscopes, accelerometers, motors, and other devices may serve as inputs to a system that continuously applies a balancing torque to the wheels on a primary axle of the dynamically balanced robot or other device to maintain the device's balance and/or positioning. This continuous application of balancing torque may require a constant supply of power to the various components of the dynamically balanced robot or other device. Additionally, constant use of dynamic balance systems may cause components of the dynamic balance system to quickly wear out.

SUMMARY

In one embodiment, a non-backdrivable passive balancing system for a single-axle dynamically balanced robotic device includes a body that includes a distal end and a proximal end, a controller module, and an actuator communicatively coupled to the controller module of the single-axle dynamically balanced robotic device. The actuator receives an engagement signal from the controller module, the engagement signal corresponding to an indication that the dynamically balanced robotic device is stationary, and the actuator causes the linkage to move the body from a disengaged position to an engaged position such that the distal end of the body contacts a ground surface and supports the dynamically balanced robotic device in a substantially upright position.

In another embodiment, a dynamically balanced robotic device includes one or more wheels rotatably coupled to a single axle, a drive module coupled to the one or more wheels, the drive module directing movement of the one or more wheels, a controller module communicatively coupled to the drive module, the controller module including a balance control sensor, and a non-backdrivable passive balancing system including a body and an actuator, the actuator communicatively coupled to the controller module.

In yet another embodiment, a single-axle dynamically balanced robotic device includes one or more wheels rotatably coupled to a single axle, a drive module coupled to the one or more wheels, the drive module directing movement of the one or more wheels, a controller module communicatively coupled to the drive module, the controller module that includes a balance control sensor, and a non-backdrivable passive balancing system that includes a body and an actuator, the actuator communicatively coupled to the controller module. In embodiments, when the single-axle dynamically balanced robotic device is in a stationary position, the controller module transmits an engagement signal to the actuator to move the body to an engaged position to contact a ground surface, and subsequently to transmit a deenergize signal to a dynamic balancing system to deenergize the one or more motors and when the single-axle dynamically balanced robotic device is in a drivable position, the controller module transmits a disengagement signal to move the body to a disengaged position not in contact with the ground surface.

These and additional features provided by the embodiments described herein can be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
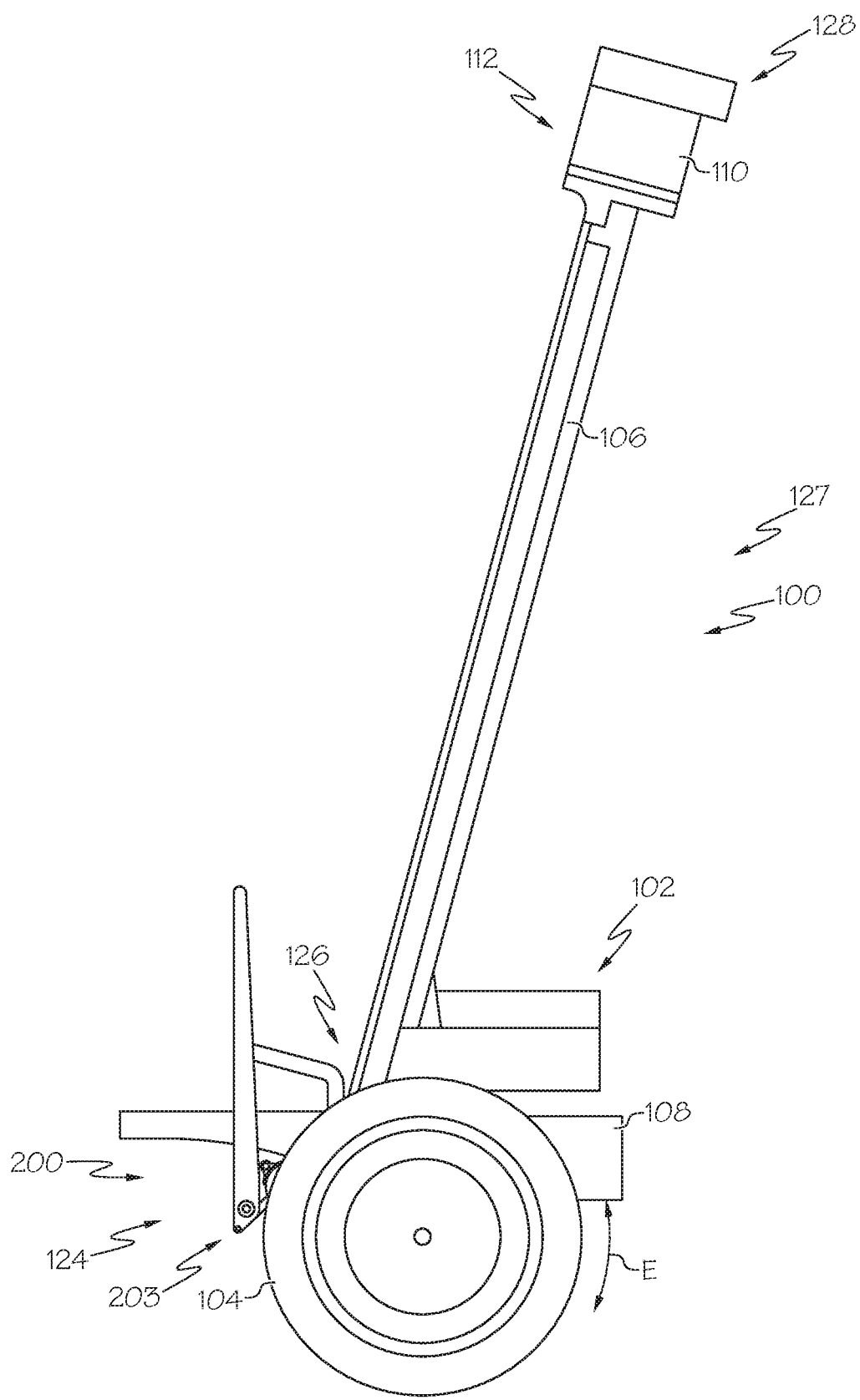
FIG. 1 schematically depicts a side view of an illustrative single-axle dynamically balanced robotic device having a non-backdrivable passive balancing system in a disengaged position, according to one or more embodiments shown and described herein.

The systems described herein generally relate to a single-axle dynamically balanced robotic device including a selectively actuated, non-backdrivable passive balancing system. The non-backdrivable passive balancing system enables the single-axle dynamically balanced robotic device to temporarily reduce use of or deactivate a dynamic balancing system to reduce or eliminate a balancing torque applied by the dynamic balancing system when the single-axle dynamically balanced robotic device is at rest. Reducing the use of or deactivating a dynamic balancing system may prevent unwanted or unnecessary use of on-board energy storage systems and/or may reduce excessive wear on components of the dynamic balancing system. The non-backdrivable passive balancing system is selectively and/or automatically actuated between an engaged position and a disengaged position to passively or semi-passively balance the single-axle dynamically balanced robotic device. The non-backdrivable passive balancing system may include one or more interlocks for preventing the non-backdrivable passive balancing system from disengaging.

Power supplies, such as batteries or other power supplies may be limited, especially in the context of robots and other devices which may have particular size-based design constraints. Thus, single-axle, dynamically balanced robots and other devices may drain their relatively limited power supplies even during periods of non-use when not connected to an external power supply, such as when the dynamically balanced robot or other device is in a stationary position, without a means for passively balancing the single-axle dynamically balanced robotic device.

Moreover, some dynamically balanced robotic devices may deploy one or more arms, legs, end effectors, or other implementation. For example, a dynamically balanced robotic device may extend an arm with a grasping end effector to pick up an object. When the dynamically balanced robotic device deploys such an implementation, the center of gravity of the single-axle dynamically balanced robotic device may change and require counter balance from its dynamic balancing system to avoid tipping. The activation of the dynamic balancing system to counter an arm or other implementation extended from the dynamically balanced robotic device may further drain the limited power supply of the dynamically balanced robotic device. In addition, programming may be necessary to ensure simultaneous deployment of the arm or other implementation and activation of the dynamic balance system.

A passive balancing system (e.g., a kickstand) may be used to balance certain 2-axle vehicles. However, passive balancing systems may only deploy manually upon the order or action of an operator or other user. As such, passive balancing systems may be susceptible to user error. Moreover, manually-activated passive balancing systems may be under-utilized or not utilized at all, and thus energy stores may be unnecessarily depleted due to non-deployment of the passive balancing systems.

In addition, such passive balancing systems may not be adapted for use with single-axle dynamically balanced systems because of the single-axle configuration of such systems. For example, a dual-axle system may include a passive balancing system (e.g., a kickstand) between two wheels on separate axles of the dual-axle system. The passive balancing systems on dual-axle systems do not need to provide support in a longitudinal direction with respect to the two axles of the dual-axle system because the dual-axle system already includes at least two points of contact with a ground surface in the longitudinal direction. Instead, passive balancing systems for dual-axle systems generally extend to a side to contact a ground surface in a lateral direction from the dual-axle system. However, in a single-axle system, there is only one axle (i.e., lateral axis) for ground surface contact. Hence, any mass held by the single axle may potentially rotate forward or backward about that single axis. A passive balancing system configured to extend forward or rearward from the single-axle device may prevent this rotation.

Additionally, it may be possible for such passive balancing systems to be erroneously disengaged. If a passive balancing system located on a dynamically balanced robotic device is erroneously disengaged, it may be necessary for the dynamic balancing system to reactivate to balance the robot or other device before it tips over, thereby draining the power supply. If the dynamic balancing system is not able to be automatically reactivated the device or robot may suffer a complete loss of balance, which may cause the robot to tip over and/or sustain damage. Accordingly, non-backdrivable passive balancing systems for single-axle dynamically balanced robotic devices may be necessary to avoid the above-mentioned issues.

As used herein, the term "backdrivable" or "backdrivable motor" describes a motor or other device that can both apply an external force and that is able to absorb an externally applied force. Backdrivable motors are used in robotics applications to permit the freedom of movement of an implementation that may be attached or otherwise coupled to the backdrivable motor in at least two directions, a "driven" and a "backdriven" direction. Accordingly, as used herein, a "non-backdrivable motor" is one that applies an external force to an implementation that may be attached or otherwise coupled to the non-backdrivable motor, but that does not absorb an externally applied force. That is, the non-backdrivable system or systems described herein may transmit a force only from an input axis to an output axis, but not vice-versa. As explained in greater detail herein, the non-backdrivable actuator of the non-backdrivable passive balancing system described herein can apply a force to a body that includes a distal end and a proximal end, however, the non-backdrivable motor will not absorb the external force applied by a support surface on which the body may rest once the body is fully deployed to an engaged position. As such, the non-backdrivable motor does not allow the body to become accidentally disengaged.

Referring now to FIG. 1, one example embodiment of a single-axle dynamically balanced robotic device 100 is depicted. The single-axle dynamically balanced robotic device 100 may generally comprise a motorized wheel assembly 102 that may include one or more motorized wheels 104 arranged on a single axis. In the particular example embodiment shown in FIG. 1, the single-axle dynamically balanced robotic device 100 includes two wheels; however, embodiments are not so limited. Embodiments having only one wheel or three or more wheels are contemplated. The motorized wheels 104 may be selectively actuated to keep the single-axle dynamically balanced robotic device 100 in a substantially vertical position while it moves or to dynamically balance the single-axle dynamically balanced robotic device 100 while it is in a stationary position, as described in greater detail herein.

The motorized wheel assembly 102 may be integrally coupled to a robot body 106 (e.g., the robot body 106 and motorized wheel assembly 102 may be molded as one component) or the motorized wheel assembly 102 may be a separate component that is mechanically coupled to the robot body 106. In some embodiments, the robot body 106 does not extend upward from the motorized wheel assembly 102 as shown in FIG. 1. Rather, the robot body 106 may extend below the motorized wheel assembly 102, may extend radially from the motorized wheel assembly 102, or may be integrated with the motorized wheel assembly 102. In the illustrated embodiment, the robot body 106 comprises a lower section 124 that is coupled to the motorized wheel assembly 102, a middle section 127, and an upper section 128. The upper section 128 may include a control assembly 110 as described in greater detail herein. Although the single-axle dynamically balanced robotic device 100 is illustrated as having a three-section body, embodiments are not limited thereto. Embodiments may comprise the robot body 106 having a single section, for example. Additionally, embodiments are contemplated in which the various sections are adjustably coupled to one another. For example, in one embodiment, the middle section 127 may be slidably coupled to one or more of the lower section 124 and the upper section 128 such that a height of the single-axle dynamically balanced robotic device 100 may be adjusted.

The one or more motorized wheels 104 may be disposed at opposing ends of an axle 126 or may be disposed around the axle 126. The motorized wheels 104 may contact a supporting surface (e.g., a floor) to support the single-axle dynamically balanced robotic device 100. The motorized wheels 104 may be rotated as depicted by arrow E by the application of one or more drive signals to a drive motor. In embodiments of the single-axle dynamically balanced robotic device 100 having two or more wheels, the motorized wheels 104 may be individually actuated to turn the single-axle dynamically balanced robotic device 100. For example, the angular velocity of a right wheel of the single-axle dynamically balanced robotic device 100 may be reduced to a value less than the angular velocity of a left wheel to turn the single-axle dynamically balanced robotic device 100. Further, the angular velocities of the wheels may be reversed. For example, a left wheel may rotate in a clockwise direction and a right wheel may rotate in a counter-clockwise direction to turn the single-axle dynamically balanced robotic device 100. The relative velocities of the motorized wheels 104 may be controlled, for example, by a control signal from the control assembly 110.

The robot body 106 may extend between a platform 108 and a control assembly 110 in some embodiments. The robot body 106, the platform 108, and the control assembly 110 may be made of a metal material such as stainless steel or aluminum, for example, or a molded plastic material. The control assembly 110 may include one or more sensors 112 for sensing objects in the environment surrounding the single-axle dynamically balanced robotic device 100. Non-limiting examples of the sensors 112 may include cameras, radar, LIDAR, sonar, accelerometers, gyroscopes, and GPS locators. The control assembly 110 may also include steering actuators or other controls of the single-axle dynamically balanced robotic device 100 as described in greater detail herein.

One or more of the control assembly 110 and the robot body 106 may house various electronic components, such as a balance control sensor and a controller module. Specific components of the control assembly 110 are described herein with respect to FIG. 7.

FIG. 1 also depicts a non-backdrivable passive balancing system 200 that may be used to passively balance the single-axle dynamically balanced robotic device 100 in an upright position, thereby allowing for deactivation of the dynamic balancing system of the single-axle dynamically balanced robotic device 100. FIG. 1 shows the non-backdrivable passive balancing system 200 in a disengaged position, but the non-backdrivable passive balancing system 200 is configured to actuate between the disengaged position and an engaged position.

Figures 2A, 2B:
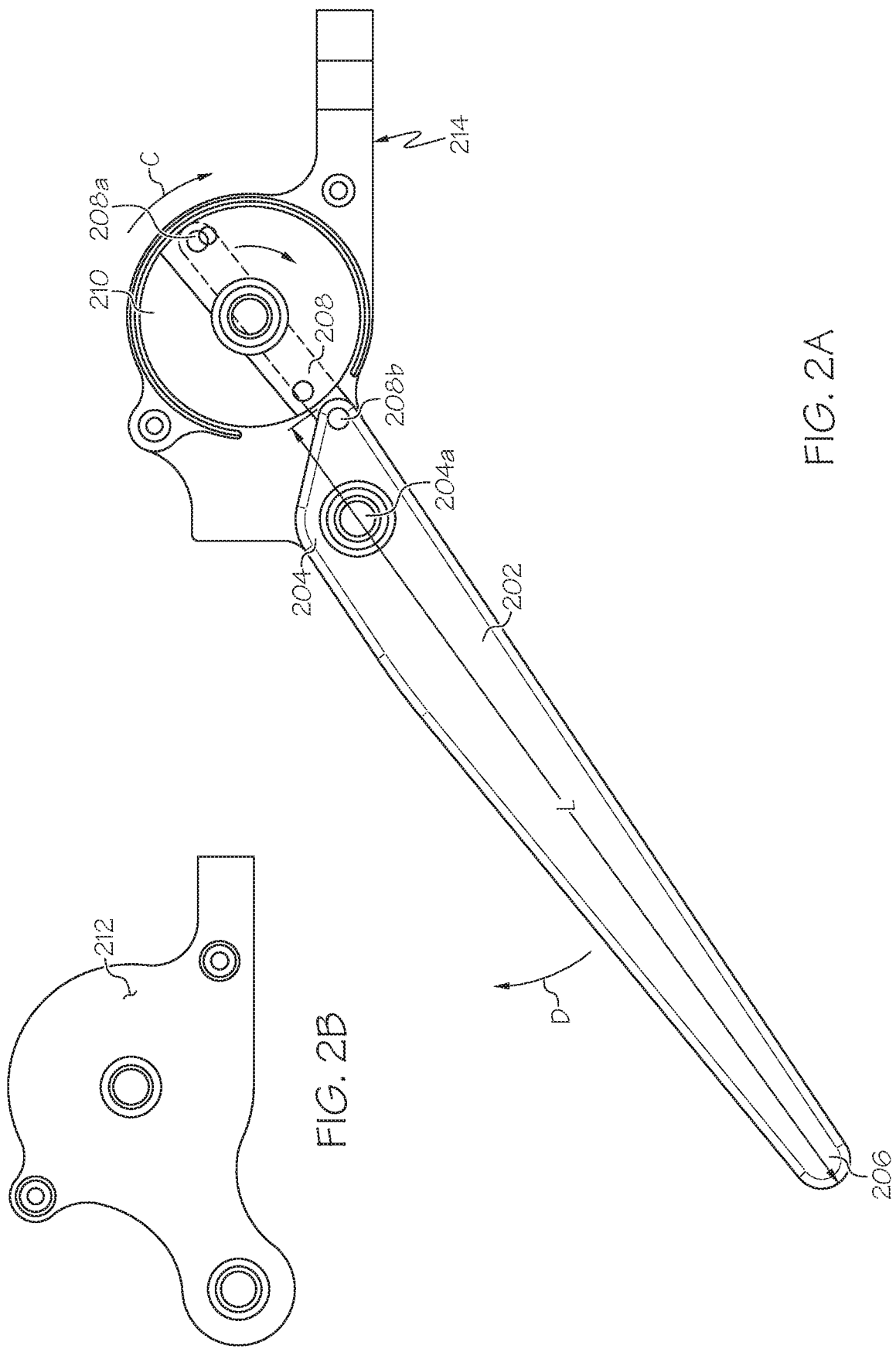
FIG. 2A depicts the non-backdrivable passive balancing system of FIG. 1 in the engaged position with a cover plate removed to show an actuator of the non-backdrivable passive balancing system, according to one or more embodiments shown and described herein.
FIG. 2B depicts an isolated view of the cover plate of FIG. 2A, according to one or more embodiments shown and described herein.

Referring to FIGS. 1 and 2A, the non-backdrivable passive balancing system 200 includes a body 202 that defines an elongate arm that spans between a proximal end 204 and a distal end 206. The non-backdrivable passive balancing system 200 includes a linkage 208 for connecting the body 202 to an actuator 210 for actuating the non-backdrivable passive balancing system 200. With the body 202 in the engaged position, the distal end 206 may contact a support surface (e.g., a floor) and the proximal end 204 may movably connect to the actuator 210. The actuator 210 may be fixed to the single-axle dynamically balanced robotic device 100. In the engaged position, the non-backdrivable passive balancing system 200 may passively balance the single-axle dynamically balanced robotic device 100.

The actuator 210 may be an actuatable motor or some other device that is capable of moving the body 202 into the engaged position from the disengaged position and vice-versa. For example, the actuator 210 may be a servo motor, a linear actuator, or some other type of mechanical or electric motor. In the example embodiment shown in FIG. 2A, the actuator 210 is a servo motor, but embodiments are not limited to this particular implementation. In some embodiments, the actuator 210 may be non-backdrivable. The actuator 210 may include one or more fixed components and one or more rotating or moveable components. For example, the actuator 210 may include a fixed annular body, an input shaft, one or more cam rollers, one or more clutches, (e.g., a two-way roller clutch), and an output shaft. In embodiments in which the actuator 210 is non-backdrivable, the body 202 may be posable in a number of positions. For example, the actuator 210 may be able to hold the pose of the body 202 in any position between and including a disengaged position and an engaged position, wherein the engaged position is a fully-actuated position of the actuator 210. Because the actuator 210 may be non-backdrivable, the supply of electric power may be stopped to the actuator 210 once the body 202 is in a desired position and the body 202 may hold its pose, thereby further increasing the battery life of the single-axle dynamically balanced robotic device 100. Other components, features, and characteristics of the actuator 210, particularly in embodiments where the actuator 210 is non-backdrivable, should generally be understood.

Still referring to FIGS. 1 and 2A, the actuator 210 may be coupled to the single-axle dynamically balanced robotic device 100 at a connection location 203. One example connection location 203 is the platform 108. In some embodiments, a base portion 214 may couple to the platform 108 to mechanically couple the non-backdrivable passive balancing system 200 to the single-axle dynamically balanced robotic device 100. However, embodiments in which the actuator 210 or other components of the non-backdrivable passive balancing system 200 are located on some other portion of the single-axle dynamically balanced robotic device 100 are contemplated. For example, the actuator 210 may be located on the lower section 124, the middle section 127, or the upper section 128 of the single-axle dynamically balanced robotic device 100. In such embodiments, a length L of the body 202 would be appropriately dimensioned such that the body 202 can extend between the connection location 203 and a support surface to maintain the single-axle dynamically balanced robotic device 100 in a generally upright position.

FIG. 2B shows a cover plate 212 of the non-backdrivable passive balancing system. The cover plate 212 may connect along a side of the non-backdrivable passive balancing system 200 between the proximal end of the body 202 and the base portion 214 of the non-backdrivable passive balancing system 200. The cover plate 212 may prevent objects such as dirt or debris from interfering with the motion of the non-backdrivable passive balancing system 200.

Figure 3:
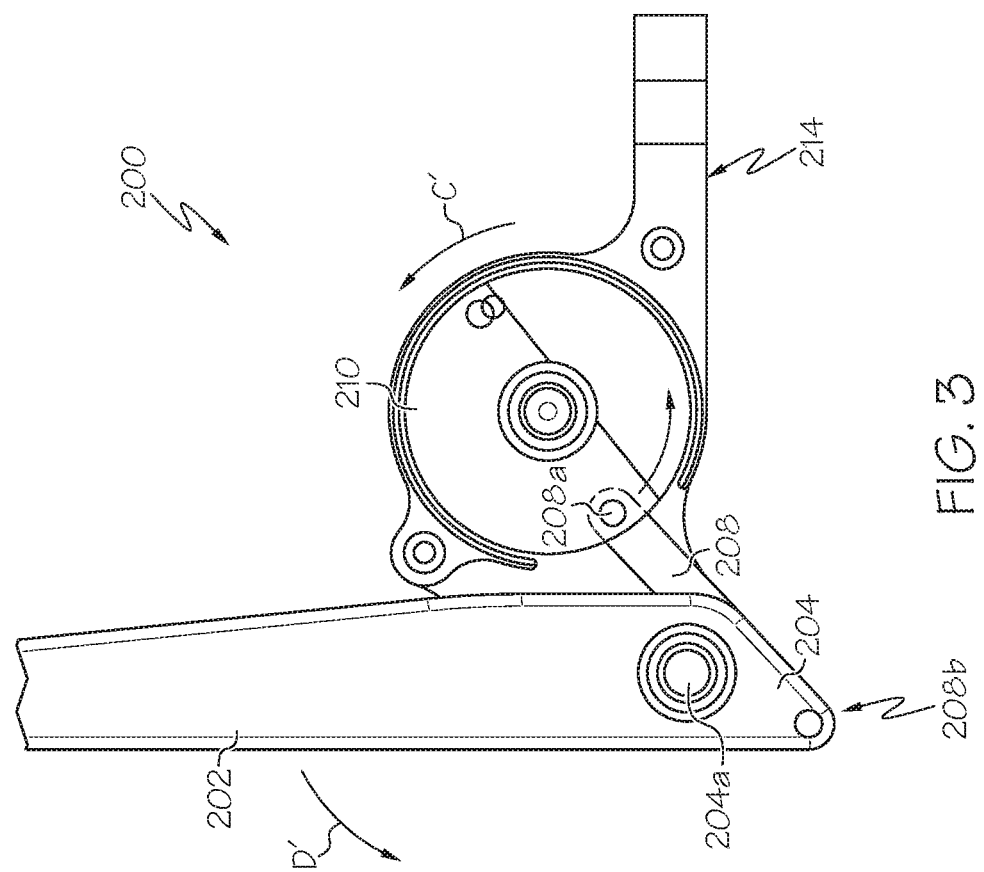
FIG. 3 depicts the non-backdrivable passive balancing system of FIG. 2A in the disengaged position with the cover plate removed, according to one or more embodiments shown and described herein.

FIGS. 2A and 3 illustrate the non-backdrivable passive balancing system 200 with the cover plate 212 illustrated in FIG. 2B removed and toggling between an engaged position (FIG. 2A) and a disengaged position (FIG. 3). The linkage 208 is pivotally connected to the proximal end 204 of the body 202 and is pivotally connected to the actuator 210. To move from an engaged position to a disengaged position, the actuator 210 rotates in the direction shown by arrow C to move the linkage 208 and rotate the body 202 as shown by arrow D. More specifically, the linkage 208 may be movably coupled to the actuator 210 at a linkage-actuator connection 208a and the linkage 208 may be movably coupled to the proximal end 204 at a linkage-proximal end connection 208b. As the actuator 210 rotates, it moves the linkage 208, which is coupled between the distal end 204 and the actuator 210. The actuator 210, through the linkage 208, causes the body 202 to rotate about a body-pivot location 204a as indicated by arrow D in FIG. 2A and arrow D' in FIG. 3 as the actuator 210 rotates. So the portion of the body 202 between the body-pivot location 204a and the distal end 204 acts a fulcrum to rotate the body 202 about the body-pivot location 204a. A full stroke of the actuator may be defined as a 180-degree rotation of the actuator 210. A full stroke of the actuator 210 may rotate the body 202 between the disengaged position and the engaged position. To move from an engaged position to a disengaged position, the actuator 210 may be electrically powered by the onboard battery stores or may be powered by some other means.

When in the engaged position, as shown in FIG. 2A, the non-backdrivable passive balancing system 200 cannot be manually backdriven (i.e., moved into the unengaged position shown in FIG. 3) until the non-backdrivable passive balancing system 200 is actuated as described herein. In some embodiments, the actuator 210 is non-backdrivable through a full stroke of the actuator 210. However, it is contemplated that in some embodiments the actuator 210 may be non-backdrivable only after the actuator 210 has completed a portion of a full stroke or a full stroke. Additionally, it is contemplated that the non-backdrivable passive balancing system 200 may include one or more mechanical interlocks. For example, the non-backdrivable passive balancing system 200 may include one or more mechanical catches, posts, or locks that lock or hold the body 202 in the engaged position or in the disengaged position.

The non-backdrivable passive balancing system 200 may be automatically engageable (i.e., it may automatically actuate from the disengaged position to the engaged position and from the engaged position to the disengaged position in response to an engagement or a disengagement signal). For example, the non-backdrivable passive balancing system 200 may automatically engage upon receiving a signal that is sent in response to a detection of one or more engagement criteria or other criteria of the single-axle dynamically balanced robotic device 100. Detection of the engagement criteria and transmission of a signal to the non-backdrivable passive balancing system 200 may be encoded as engagement instructions stored in one or more memory devices on the single-axle dynamically balanced robotic device 100 or in a server communicatively coupled to the single-axle dynamically balanced robotic device 100 as described. Other non-limiting examples of engagement criteria include a balance, an orientation, a velocity, and an acceleration of the single-axle dynamically balanced robotic device 100. Other non-limiting engagement criteria include a battery capacity, a battery level, and a battery use rate of the single-axle dynamically balanced robotic device 100. In some embodiments, the engagement criteria may be based on an input from the one or more sensors 112 coupled to the single-axle dynamically balanced robotic device 100 or from one or more sensors remote from the single-axle dynamically balanced robotic device 100, such as an external camera, a proximity sensor such as LIDAR, radar, or sonar, or any other type of externally-positioned sensor.

In some embodiments, the non-backdrivable passive balancing system 200 may be manually engageable. For example, in some non-limiting example embodiments, an external actor, such as a human, may utilize a user interface to transmit a signal to the single-axle dynamically balanced robotic device 100 to engage the non-backdrivable passive balancing system 200. In some embodiments, an external actor may engage the non-backdrivable passive balancing system 200 or disengage the non-backdrivable passive balancing system 200 if the non-backdrivable passive balancing system 200 is not in a non-backdrivable state. In some non-limiting example embodiments, the an external actor may push a button located on the single-axle dynamically balanced robotic device 100, such as at the control assembly 110, or at some other location to engage the non-backdrivable passive balancing system 200.

The time required for the non-backdrivable passive balancing system 200 to transfer between the engaged position and the disengaged position may be referred to as an engagement time. In some embodiments of the single-axle dynamically balanced robotic device 100, the controller module 134 or some other component of the single-axle dynamically balanced robotic device 100 may track a battery capacity, a battery level, and a battery use rate. In some embodiments, if the controller module 134 calculates that a current battery use rate or expected battery use rate will lower the battery capacity to below a threshold value, to zero, or to essentially zero in a time period shorter than the engagement time, the controller module 134 may engage the non-backdrivable passive balancing system 200 in order to prevent the single-axle dynamically balanced robotic device 100 from losing balance. As used herein, the current battery use rate is the rate of power draw on the battery from all systems that are powered by the battery. As used herein, the expected battery use rate is a calculated rate of power draw from all systems that are expected to be powered by the battery at a particular time. In some embodiments, it may be desirable for the non-backdrivable passive balancing system 200 engages at some time before the engagement time, to provide a comfortable margin of error such that the battery is sure to not approach a threshold value or a zero value before the non-backdrivable passive balancing system 200 can engage. The controller module 134 may calculate an engagement time multiple that is a multiple of the engagement time to extend the length of time between the battery level reaching a multiple of the threshold value and the threshold value. More specifically, the engagement time multiple may be a time that is one, two, three, etc. multiples of the engagement. By using an engagement time multiple, the non-backdrivable passive balancing system 200 may ensure that the body 202 is always engaged before the engagement time so that the single-axle dynamically balanced robotic device 100 does not lose balance before the body 202 can engage.

It should be understood that the various components described herein with respect to the non-backdrivable passive balancing system 200 are merely illustrative. Other non-backdrivable passive balancing systems and/or components are contemplated and included in the scope of the present disclosure.

Figure 4A:
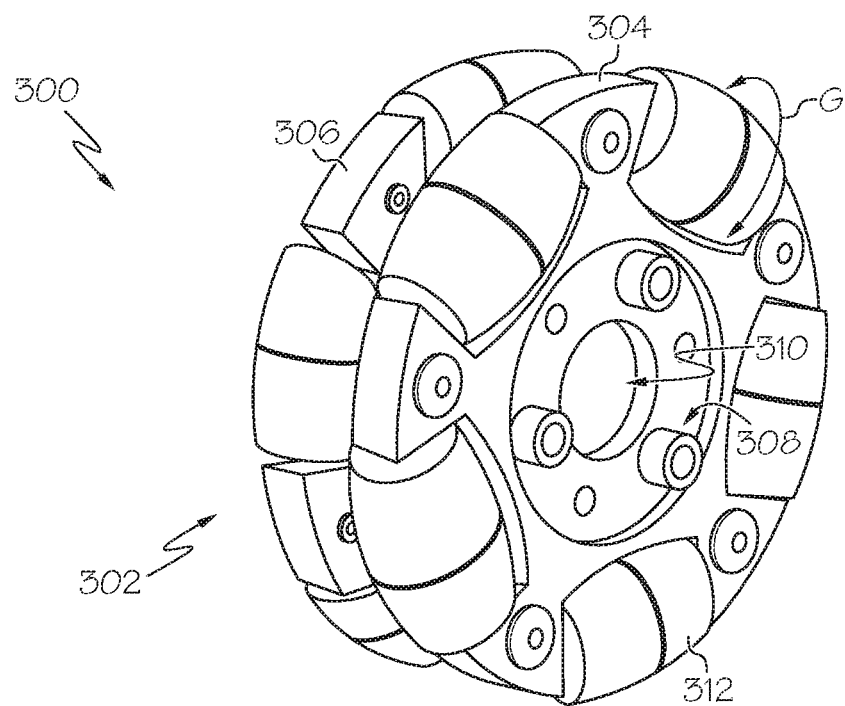
FIG. 4A depicts an illustrative omnidirectional wheel that may be coupled to a distal end of the body of the non-backdrivable passive balancing system of FIG. 2A, according to one or more embodiments shown and described herein.
Figure 4B:
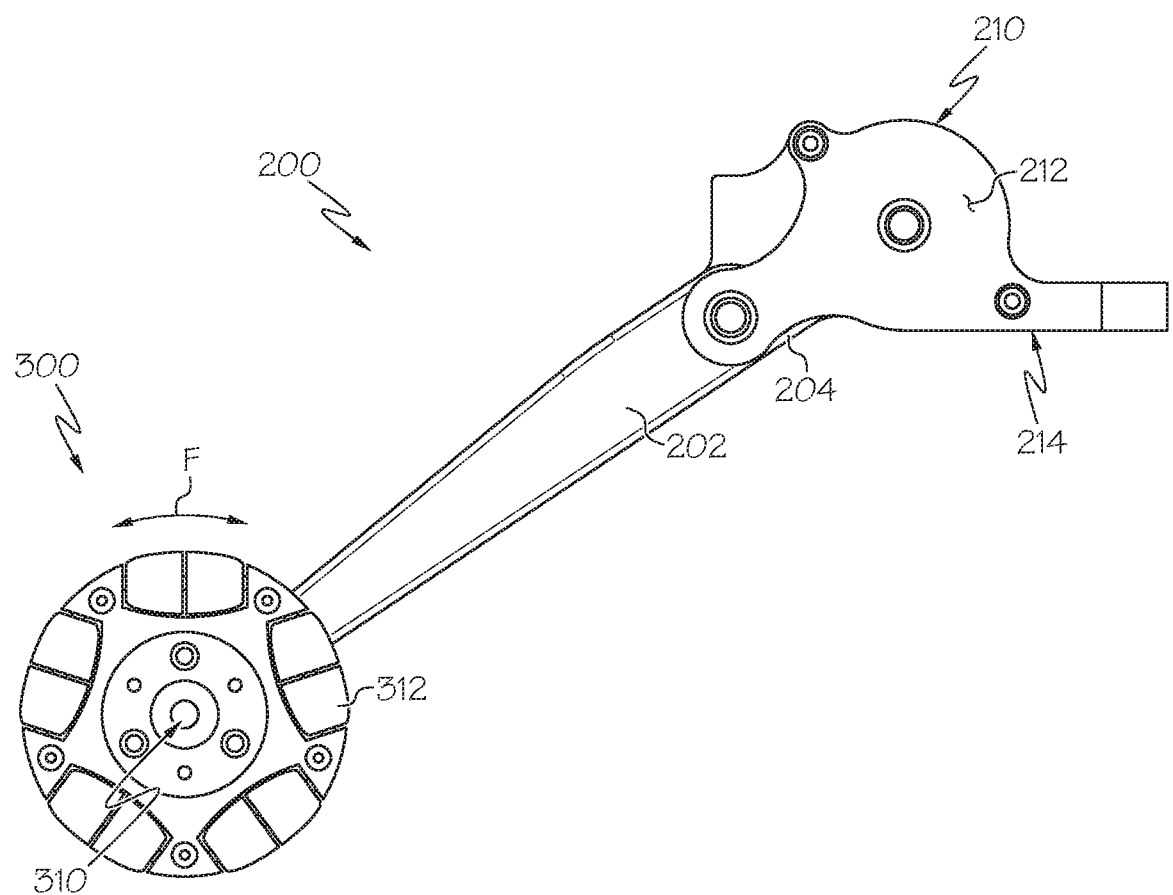
FIG. 4B depicts the body of the non-backdrivable passive balancing system of FIG. 2A including an illustrative wheel at a distal end of the body of the non-backdrivable passive balancing system, according to one or more embodiments shown and described herein.

FIGS. 4A and 4B show an omnidirectional wheel 300 for coupling to the distal end 206 of the body 202 of the non-backdrivable passive balancing system 200. The omnidirectional wheel 300 may include a dual-disc body 302 with a first disc 304 and a second disc 306 coupled at a central joint 308 that may be rotatably coupled to roller or wheel bearing or similar rotating bearing (not shown). The roller or wheel bearing may encircle a central hole 310 of the omnidirectional wheel 300. The central hole 310 may serve as a connection location for attaching the omnidirectional wheel 300 to the distal end 206 of the body 202 of the non-backdrivable passive balancing system 200, as shown in FIG. 4B. The omnidirectional wheel 300 may rotate around the central hole 310 in the direction indicated by the double arrow F in FIG. 4B as the single-axle dynamically balanced robotic device 100 moves.

Each of the first disc 304 and the second disc 306 may include one or more circumferential rollers 312 that surround the disc at various locations around the circumference of the disc. The circumferential rollers 312 may rotate in a direction that is generally perpendicular to the direction of rotation the first disc 304 and the second disc 306 as indicated by the arrow G in FIG. 4A such that the omnidirectional wheel can move corresponding to at least two axes of rotation. That is, the combined rotation of the first disc 304 and the second disc 306 with the rotation of the circumferential rollers 312 enables the omnidirectional wheel to rotate in multiple dimensions. In embodiments that include a non-backdrivable passive balancing system 200 and a second non-backdrivable passive balancing system 200', as described herein. One or both may include an omnidirectional wheel 300.

Figure 5:
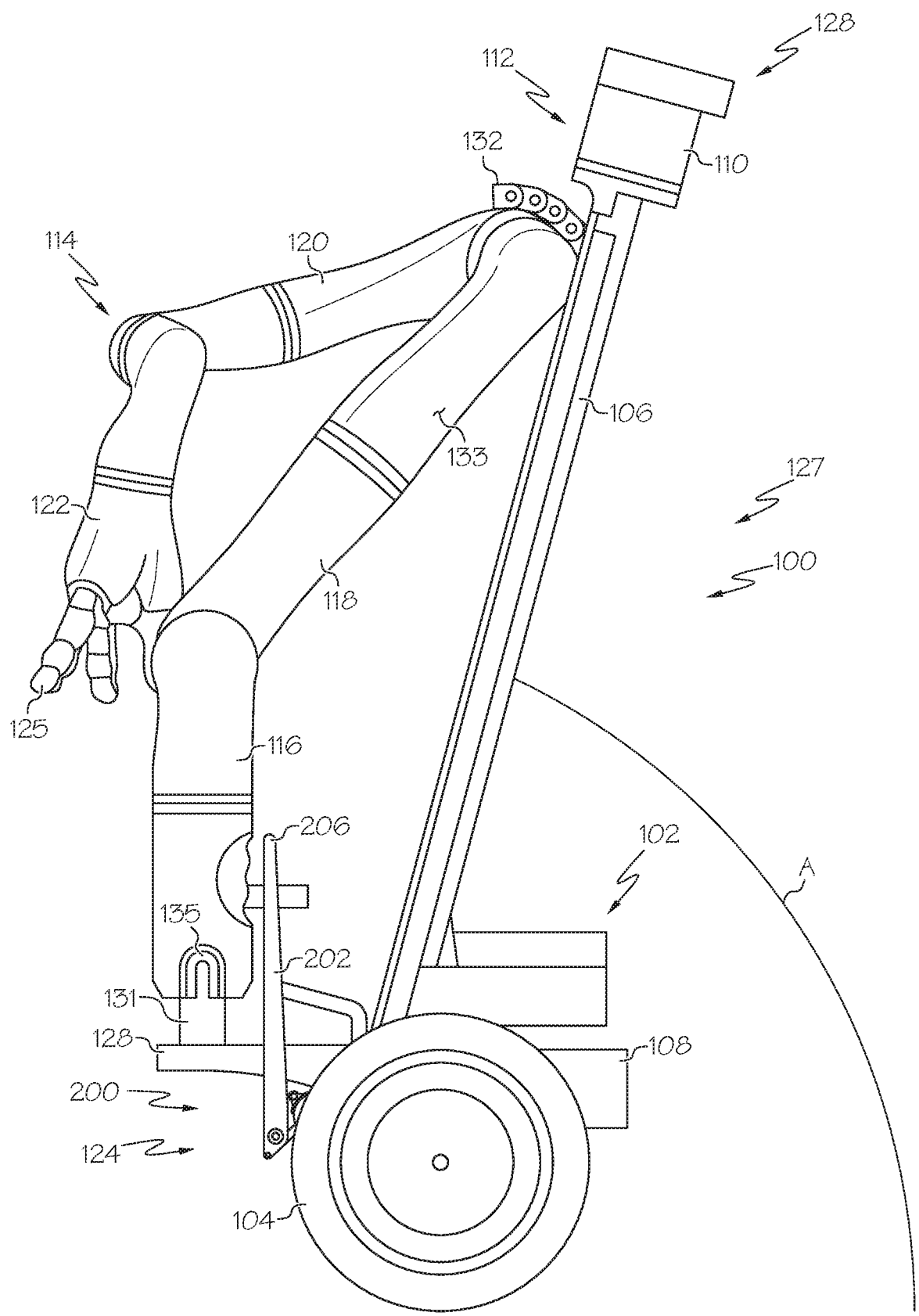
FIG. 5 depicts the single-axle dynamically balanced robotic device of FIG. 1 with an illustrative extendable robotic arm including one or more end effectors in a retracted position and the non-backdrivable passive balancing system in a disengaged position, according to one or more embodiments shown and described herein.

Referring now to FIG. 5, the single-axle dynamically balanced robotic device 100 of FIG. 1 is shown including an extendable robotic arm assembly 114. In some embodiments, the extendable robotic arm assembly 114 may extend upward from a base 131 that may be integrally coupled with the platform 108, but embodiments are not so limited. It is contemplated that the base 131 may extend in any direction from the single-axle dynamically balanced robotic device 100. The extendable robotic arm assembly 114 may be mounted to the base 131 at a rotating joint 135 that rotates the extendable robotic arm assembly 114 with respect to the single-axle dynamically balanced robotic device 100. The extendable robotic arm assembly 114 may include a base portion 116 that rotatably couples to the single-axle dynamically balanced robotic device 100 at the rotating joint 135, a second portion 118, a third portion 120, and an end effector 122. The second portion 118 may be pivotally coupled between the base portion 116 and the third portion 120. The third portion 120 may be pivotally coupled between the second portion 118 and the end effector 122. It should be understood that the various portions here are merely illustrative.

In some embodiments, the extendable robotic arm assembly 114 may be covered in a sheath 133 that prevents exposure of the joints and wiring of the extendable robotic arm assembly 114. The sheath 133 may be fabricated from a fabric material such as, for example, canvas, cotton, or polyester. The sheath 133 may house various wires and connections to prevent exposure to the wires and connections. The sheath 133 may be continuous along the length of the extendable arm or may be cover each of the various portions of the arm separately.

The end effector may include one or more fingers 125 for grasping objects in the environment with the extendable robotic arm assembly 114. As depicted in FIG. 5, the end effector 122 includes three fingers 125, but embodiments are not so limited. Each of the fingers 125 may include one or more joints that allow the fingers 125 to curl inward and outward enabling the extendable robotic arm assembly 114 to grasp or otherwise interact with objects in a surrounding environment. Other manipulation devices besides fingers 125 are contemplated and included within the scope of the present disclosure. For example, hooks, inflatable bags, suction cups, and/or the like may be coupled to the end effector 122.

As shown in FIG. 5, the extendable robotic arm assembly 114 and the non-backdrivable passive balancing system 200 are on the same side of the single-axle dynamically balanced robotic device 100. However, embodiments are not limited to this arrangement. It is contemplated that the non-backdrivable passive balancing system 200 may be on an opposite side as the extendable robotic arm assembly 114 or on a side of the single-axle dynamically balanced robotic device 100.

Figure 6:
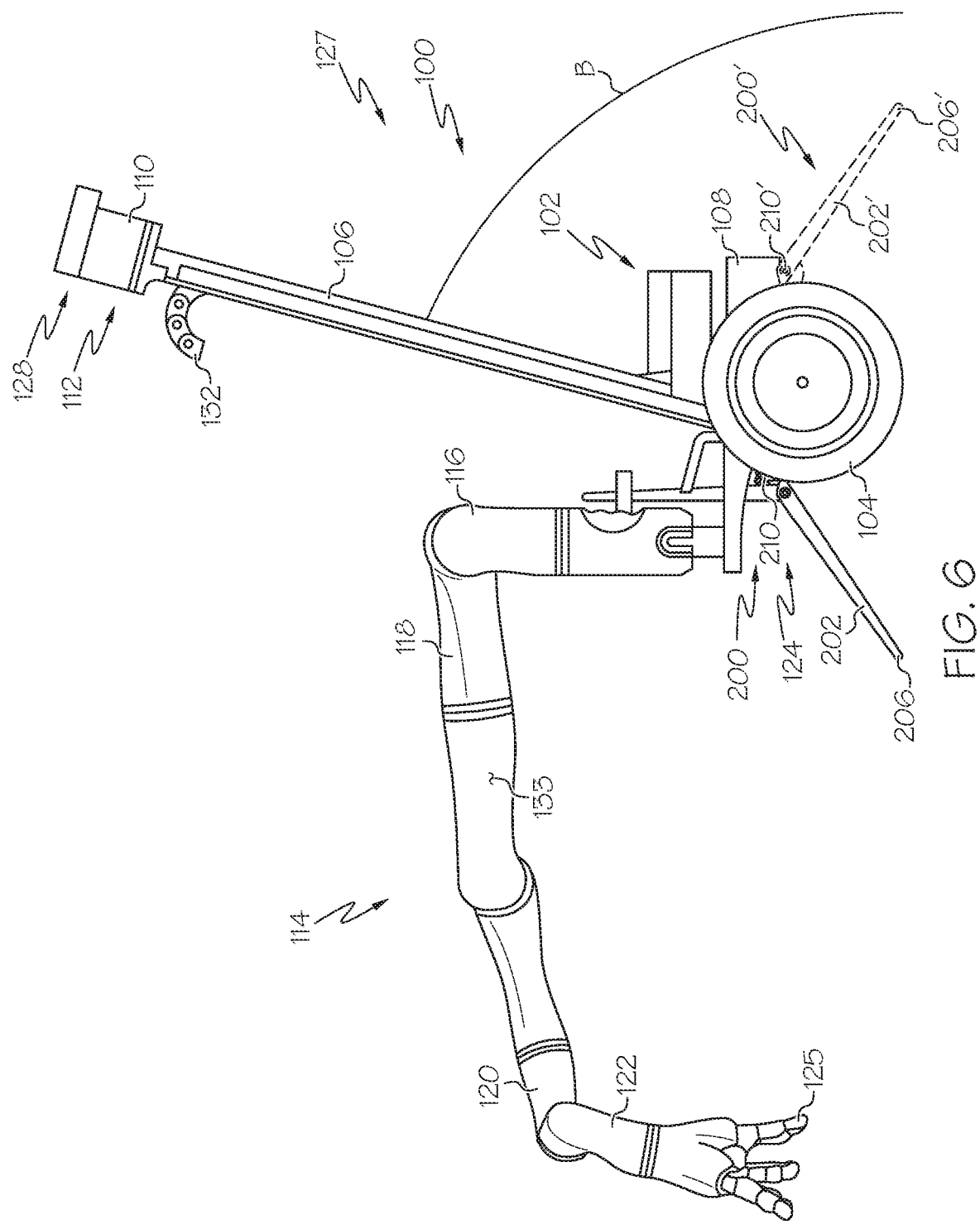
FIG. 6 depicts the single-axle dynamically balanced robotic device of FIG. 5 with the extendable robotic arm including the one or more end effectors in an extended position and the non-backdrivable passive balancing system in an engaged position, according to one or more embodiments shown and described herein.

FIG. 6 shows the extendable robotic arm assembly 114 in an extended position. The extendable robotic arm assembly 114 is extended forward of the single-axle dynamically balanced robotic device 100 by pivoting between the base portion 116 and the second portion 118 and between the third portion 120 and the end effector 122. When in the extended position, the extendable robotic arm assembly 114 is clear of a catch 132 that may catch and hold the extendable robotic arm assembly 114 when the extendable robotic arm assembly 114 is in the retracted position. The catch 132 is shown over the extendable robotic arm assembly 114 in FIG. 5. With the extendable robotic arm assembly 114 in the extended position, the non-backdrivable passive balancing system 200 may be engaged to relieve the necessity for operation of the dynamic balancing system. Accordingly, the non-backdrivable passive balancing system 200 is shown in the engaged position in FIG. 6.

Referring to FIGS. 5 and 6, the motion of the extendable robotic arm assembly 114 and its effect on the single-axle dynamically balanced robotic device 100 will now be described. As shown in FIG. 6, when the extendable robotic arm assembly 114 is in an extended position the non-backdrivable passive balancing system 200 may engage. The actuator 210 may rotate the body 202 in the counter-clockwise direction from the disengaged position to the engaged position. The distal end 206 of the body 202 may engage the support surface adding another point of contact between the single-axle dynamically balanced robotic device 100 and the support surface.

When the extendable robotic arm assembly 114 moves or extends as shown in the non-limiting example embodiment shown in FIG. 6, the center of gravity of the single-axle dynamically balanced robotic device 100 may shift, for example, the center of gravity may shift forward when the extendable robotic arm assembly 114 extends. During this shift, if the dynamic balancing system is in use, the dynamic balancing system may calculate a new dynamic torque to place on the motorized wheel assembly 102 to keep the single-axle dynamically balanced robotic device 100 upright and stationary. For example, the orientation of the single-axle dynamically balanced robotic device 100 before the extendable robotic arm assembly 114 extends is shown by angle A of FIG. 5. The orientation of the single-axle dynamically balanced robotic device 100 after the extendable robotic arm assembly 114 extends is shown by angle B of FIG. 6. In some embodiments, the dynamic balancing system may apply a dynamic torque to the motorized wheel assembly 102 to keep angle B equal to angle A. In some embodiments, the dynamic balancing system may place a dynamic torque on the motorized wheel assembly 102 to keep angle B within a certain percentage of angle A. The dynamic torque required may be constantly varying during operations of the extendable robotic arm assembly 114 as the center of gravity of the single-axle dynamically balanced robotic device 100 continues to vary. This may require constant adjustment of the dynamic torque. The application and change of the dynamic torque may quickly drain on-board energy stores, requiring a recharge of the battery and possibly requiring the single-axle dynamically balanced robotic device 100 to stop work.

To avoid draining the on-board power supplies more quickly than necessary, the single-axle dynamically balanced robotic device 100 may engage the non-backdrivable passive balancing system 200. When engaged, the non-backdrivable passive balancing system 200 adds an additional touchpoint with a support surface, holding the single-axle dynamically balanced robotic device 100 in the upright position. The non-backdrivable passive balancing system 200 may engage based on one or more of the automatic or manual engagement criteria discussed herein.

Referring to FIG. 5, the extendable robotic arm assembly 114 is in a retracted position and the non-backdrivable passive balancing system 200 is in a disengaged position. The single-axle dynamically balanced robotic device 100 can move with the extendable robotic arm assembly 114 in the extended position. However, it may be more convenient for the single-axle dynamically balanced robotic device 100 to move with the extendable robotic arm assembly 114 in the retracted position. Additionally, with the non-backdrivable passive balancing system 200 in the disengaged position, the single-axle dynamically balanced robotic device 100 can move by applying a drive signal to the motorized wheel assembly 102. However, embodiments are contemplated in which the single-axle dynamically balanced robotic device 100 can move with the non-backdrivable passive balancing system 200 in an engaged position. For example, the single-axle dynamically balanced robotic device 100 may move with the non-backdrivable passive balancing system 200 in an engaged position whether the extendable robotic arm assembly 114 is in an extended position or a retracted position.

Briefly referring to FIG. 4B, the distal end 206 of the body 202 of the non-backdrivable passive balancing system 200 may include a wheel 216. When the wheel 216 contacts the support surface, the single-axle dynamically balanced robotic device 100 may receive passive support and cause less friction between the non-backdrivable passive balancing system 200 and the support surface as the single-axle dynamically balanced robotic device 100 moves. This may reduce consumption of on-board energy stores because the extendable robotic arm assembly 114 may not need to be retracted as the single-axle dynamically balanced robotic device 100 moves from location to location and because the non-backdrivable passive balancing system 200 may remain engaged while the single-axle dynamically balanced robotic device 100 moves, reducing the level of dynamic torque required as the single-axle dynamically balanced robotic device 100 moves. Moreover, a wheel, such as the wheel 216, may reduce or eliminate drag on the system which can lead to battery drain and/or damage to the system.

As shown in FIG. 6, some embodiments of the single-axle dynamically balanced robotic device 100 may include a second non-backdrivable passive balancing system 200' with a second body 202', a second distal end 206', and a second actuator 210' for balancing the single-axle dynamically balanced robotic device 100. The engagement criteria for the second non-backdrivable passive balancing system 200' may be similar or identical to the engagement criteria for the non-backdrivable passive balancing system 200. The locations of the non-backdrivable passive balancing system 200 and the second non-backdrivable passive balancing system 200' shown in FIG. 6 are across the platform 108 from one another; however, other arrangements are contemplated. It is contemplated that the non-backdrivable passive balancing system 200 and the second non-backdrivable passive balancing system 200' may be on the same side or opposite sides of the single-axle dynamically balanced robotic device 100.

Figure 7:
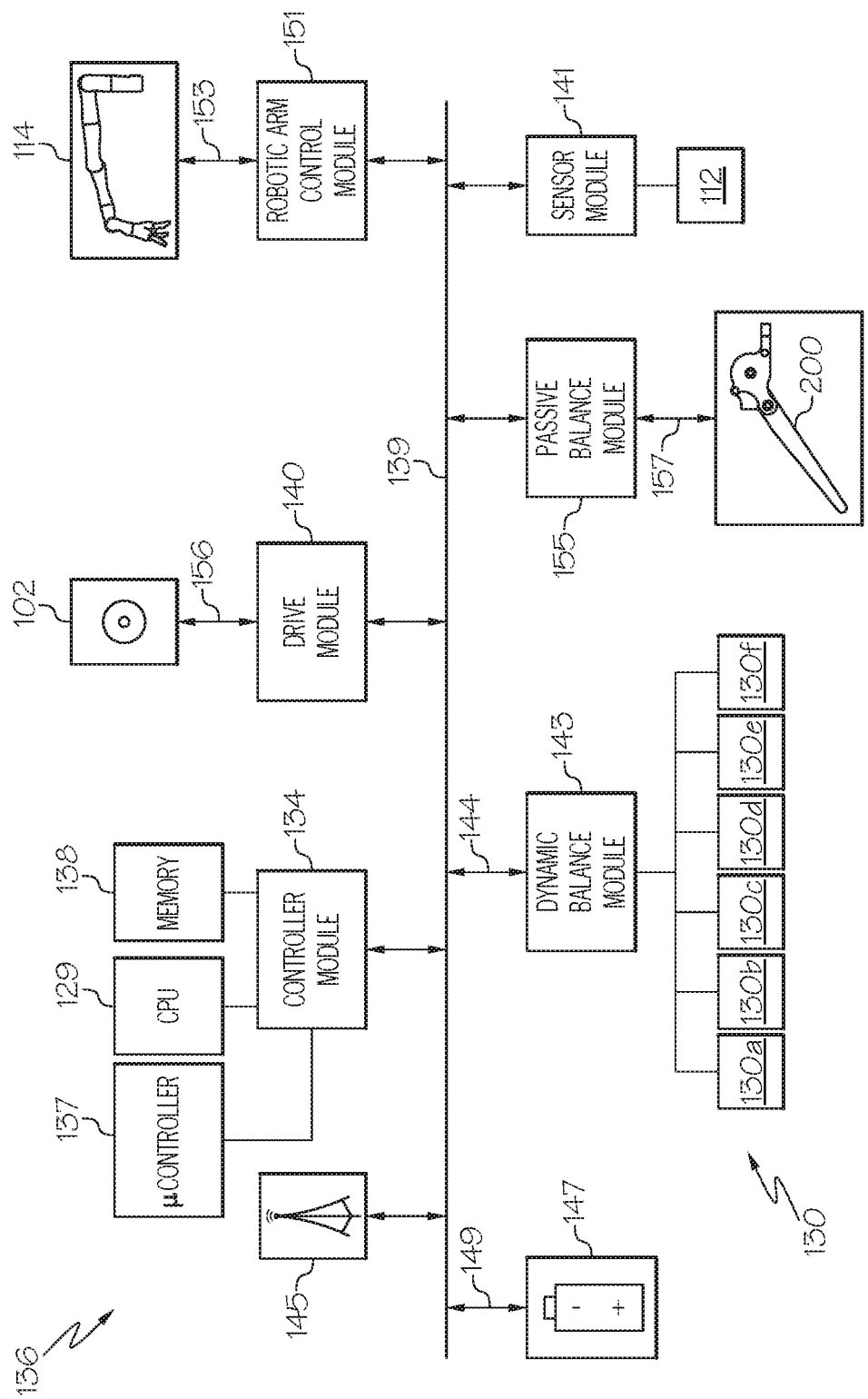
FIG. 7 depicts a schematic block diagram of an illustrative controller module for controlling the single-axle dynamically balanced robotic device of FIGS. 1, 5, and 6, according to one or more embodiments shown and described herein.

Referring now to FIG. 7, the motorized wheel assembly 102 may be controlled by the application of one or more drive signals produced and provided by a controller module 134. The controller module 134 may be physically located in the control assembly 110 (FIG. 1) or may be located at some other location on the single-axle dynamically balanced robotic device 100. In some embodiments, the controller module 134 may receive one or more signals for controlling the device from a remote server. Accordingly, one or more of the control assembly 110 (FIG. 1) and the controller module 134 may include a means for sending and receiving electronic signals. Non-limiting examples include a wireless modem, a wireless transceiver, and a radio transceiver.

FIG. 7 illustrates a schematic of various additional components of an illustrative dynamically balanced robotic device control system 136. The dynamically balanced robotic device control system 136 may include a controller module 134 that may comprise a CPU 129, a microcontroller 137, and a memory 138. The controller module 134 may be communicatively coupled to a drive module 140 that comprises drive signal electronics for driving the motorized wheel assembly 102. For example, the controller module 134 may be coupled to the drive module 140 and/or other components of the control system 136 via a local interface 139, such as, for example, a bus. The dynamically balanced robotic device control system 136 may be communicatively coupled to an outside control system through a communications module 145. The communications module 145 may include a device for sending and receiving electronic signals. Non-limiting examples include wifi and radio signals. One or more instructions for operating the dynamically balanced robotic device control system 136 may be stored on a local or an external memory and accessed via the communications module 145, such as, for example, in a cloud network. The controller module 134 may include other components that are not shown, such as input signal conditioning circuits to prepare one or more input signals prior to being received at the microcontroller 137. Input signal conditioning circuits may include, for example, an analog to digital converter for converting analog input signals into digital signals, etc. In some embodiments, the microcontroller 137 may comprise integrated analog-to-digital and digital-to-analog converters.

The input signals may include sensor signals provided to a sensor module 141 by the sensors 112, a balance signal 144 from a dynamic balance module 143, or from another component of the dynamically balanced robotic device control system 136. The memory 138 may be operable to store computer executable instructions that, when read and executed by the CPU 129 or the microcontroller 137, cause the controller module 134 to produce the drive signals 156 that are provided to the motorized wheel assembly 102. The set of computer executable instructions may include a control algorithm that may calculate one or more of a dynamic torque, a velocity, and an acceleration to apply to the motorized wheel assembly 102 through one or more motors coupled to the motorized wheel assembly 102. The control algorithm may utilize, at least in part, the balance signal 144.

The drive module 140 may be provided to receive signals from the microcontroller 137 and produce drive signals 156 that are sent to the motorized wheel assembly 102 to control the motion and balance control of the single-axle dynamically balanced robotic device 100. The drive module 140 may include transistors or other switching devices that are configured to output voltage or current in accordance with instructions from the microcontroller 137. The drive signals 156 provided to the motorized wheel assembly 102 may depend on the particular type and configuration of the motorized wheel assembly 102. For example, in a two-wheeled embodiment with a left and a right wheel on a single axle, the drive signals 156 may comprise a left-wheel drive signal and a right-wheel drive signal. These signals may be sent individually to the drive module 140 to control the speed of the left wheel and the right wheel individually. This may enable the single-axle dynamically balanced robotic device 100 to turn left and right at variable turn radii. In another embodiment, the drive module 140 may further comprise digital-to-analog converters operable to translate digital signals provided by the microcontroller 137 into analog signals to produce analog drive signals that are provided to the motorized wheel assembly 102. Additionally, the one or more wheels 104 of the motorized wheel assembly 102 may turn in opposite directions in order to turn the single-axle dynamically balanced robotic device 100.

A dynamic balance module 143 may comprise a plurality of balance control sensors that may determine an orientation and movement of the single-axle dynamically balanced robotic device 100. The balance control sensors may be a part of a dynamic balance system and comprise one or more gyroscopes 130a, 130b, 130c and/or one or more accelerometer devices 130d, 130e, 130f that are capable of determining at least an orientation, velocity, and acceleration of the single-axle dynamically balanced robotic device 100. The balance signal 144 provided by the balance control sensors may at least partially correspond to a dynamic angle A (FIG. 5) that is the difference between an actual orientation angle and a vertical orientation of the single-axle dynamically balanced robotic device 100. The balance signal 144 may also provide information relating to a direction and acceleration in which the single-axle dynamically balanced robotic device 100 may be travelling.

Still referring to FIG. 7, in some embodiments, the controller module 134 may have a control algorithm stored in the memory 138 to maintain the single-axle dynamically balanced robotic device 100 balanced in a substantially upright position during an autonomous robotic operation as described in greater detail herein. The control algorithm could be any algorithm now known or later developed for controlling a dynamical balancing system. Such algorithms are included in the scope of the present application. During the autonomous robotic operation, the controller module 134 may maintain the single-axle dynamically balanced robotic device 100 in a substantially upright position. The controller module 134 may calculate a dynamic torque to keep the single-axle dynamically balanced robotic device 100 in a substantially upright position. The balancing velocity may cause the single-axle dynamically balanced robotic device 100 to move slightly to counter a falling motion of the single-axle dynamically balanced robotic device 100 such that the single-axle dynamically balanced robotic device 100 remains upright.

The dynamically balanced robotic device control system 136 may include a battery module 147 for controlling and monitoring the battery. The battery module 147 may include one or more sensors for sensing one or more of a battery level, a battery capacity, and a battery use rate. The battery module 147 may send a battery control signal 149 to the dynamically balanced robotic device control system 136 to control its operation.

The dynamically balanced robotic device control system 136 may further comprise a robotic arm control module 151 for developing a robotic arm control signal 153 used to control an extendable robotic arm assembly 114 as described in greater detail herein. The dynamically balanced robotic device control system 136 may also include a passive balance control module 155 for developing an engagement signal 157 for engaging a non-backdrivable passive balancing system 200 as described in greater detail herein.

Referring to FIGS. 5 and 7, the dynamically balanced robotic device control system 136 may balance the single-axle dynamically balanced robotic device 100 at the dynamic angle A with respect to the support surface when the single-axle dynamically balanced robotic device 100 is stationary or is in motion. More specifically, the single-axle dynamically balanced robotic device 100 may maintain a constant angle by minimizing accelerations once a desired velocity is obtained, including a zero velocity. In some embodiments, the dynamic angle A may adjust based on the desired velocity of the single-axle dynamically balanced robotic device 100. For example, for higher velocities, the dynamic angle A may increase (i.e., the robot body 106 may approach a more vertical angle with respect to the support surface) and for slower velocities the dynamic angle A may decrease (i.e., the robot body 106 may approach a less vertical angle with respect to the support surface). In some embodiments, the dynamic angle A may be substantially perpendicular with the support surface.

Figure 8:
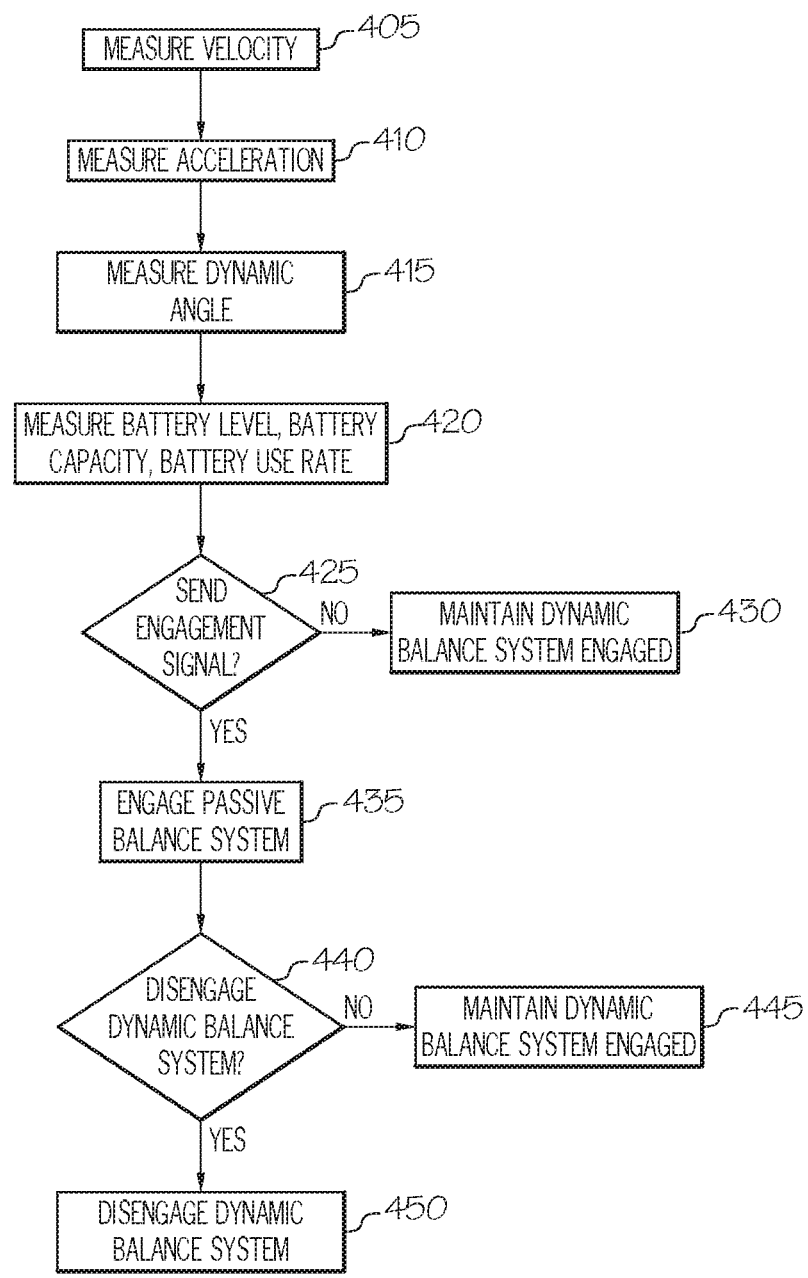
FIG. 8 depicts a flow diagram that depicts one example embodiment of the process completed by the controller module when determining whether to deploy the non-backdrivable passive balancing system of FIGS. 2A and 3, according to one or more embodiments shown and described herein.

Referring to FIGS. 7 and 8, a process for determining whether or not to engage the non-backdrivable passive balancing system 200 is described. At step 405, one or more of the velocity and the angular velocity of the single-axle dynamically balanced robotic device 100 may be measured. The velocity and the angular velocity may be measured, for example, by one of the sensors 130a-130f of the dynamic balance module 143. If one or more of the velocity and the angular velocity are below a velocity threshold, the non-backdrivable passive balancing system 200 may cause the controller module 134 to generate an engagement signal to engage the body 202.

At step 410, one or more of the acceleration and the angular acceleration of the single-axle dynamically balanced robotic device 100 may be measured. The acceleration and the angular acceleration may be measured, for example, by one of the sensors 130a-130f of the dynamic balance module 143. If one or more of the acceleration and the angular acceleration are below an acceleration threshold, the non-backdrivable passive balancing system 200 may cause the controller module 134 to generate an engagement signal to engage the body 202. For example, the acceleration threshold may be any positive or negative acceleration, such that the non-backdrivable passive balancing system 200 may only engage if the single-axle dynamically balanced robotic device 100 is stationary. In other embodiments, the non-backdrivable passive balancing system 200 may engage if the acceleration is between a zero value and a positive or negative non-zero threshold value.

At step 415, a dynamic angle may be measured. The dynamic angle may be a difference between a substantially vertical angle and the actual angle of the single-axle dynamically balanced robotic device 100. The dynamic angle may be measured, for example, by one or more of the sensors 130a-130f of the dynamic balance module 143. If the dynamic angle is below a dynamic angle threshold, the non-backdrivable passive balancing system 200 may cause the controller module 134 to generate an engagement signal to engage the body 202. The dynamic angle threshold may indicate a maximum allowable dynamic angle in order for the non-backdrivable passive balancing system 200 to be useful. Above this threshold, it might not be desirable for the non-backdrivable passive balancing system 200 to actuate because the single-axle dynamically balanced robotic device 100 may be at an angle where the non-backdrivable passive balancing system 200 may not contact a ground surface if it is engaged.

At step 420, one or more of the battery level, the battery capacity, and the battery use rate may be measured. One or more of the battery level, the battery capacity, and the battery use rate may be measured by one or more components of the battery module 147, for example. If one or more of the battery level, the battery capacity, and the battery use rate are below one or more of a battery level threshold, a battery capacity threshold, and a battery use rate threshold, respectively, the non-backdrivable passive balancing system 200 may cause the controller module 134 to generate an engagement signal to engage the body 202. For example, an engagement signal may be sent to the non-backdrivable passive balance system 200 just before the battery is at a level where the single-axle dynamically balanced robotic device 100 can no longer provide sufficient electrical power to operate the dynamic balancing system.

At step 425, the controller module 134 may determine, based on one or more of the factors listed herein, to generate an engagement signal. For example, if the single-axle dynamically balanced robotic device 100 is in a fixed location, not moving, with the extendable robotic arm in an extended position utilizing the one or more fingers of the end effector and using the dynamic balancing system to balance and the battery level approaches a zero-level, the non-backdrivable passive balancing system 200 may be engaged before the battery is completely spent to avoid losing balance. In such a case, the dynamic balancing system may deenergize to reduce battery usage.

The engagement signal may be sent to cause the actuator to actuate and engage the body of the non-backdrivable passive balancing system at step 435. As shown at step 430, if the engagement signal is not generated, the single-axle dynamically balanced robotic device 100 will maintain the dynamic balancing system in use. If the engagement signal is generated and sent to the non-backdrivable passive balancing system 200 and the non-backdrivable passive balancing system 200 is engaged, the controller module may make a decision whether or not to disengage the dynamic balancing system at step 440. For example, the non-backdrivable passive balancing system 200 may be engaged but the on-board logic or an external instruction may send instructions that the conditions requiring use of the non-backdrivable passive balancing system 200 will only be present for a short period of time. In such an instance, it may be advantageous to maintain the dynamic balancing system engaged.

If the dynamic balance system is not disengaged, an engagement signal for the dynamic balance system may be maintained at step 445. If the dynamic balance system is disengaged, a disengage signal for the dynamic balance system may be sent at step 450. For example, the on-board logic may determine that the dynamic balancing system is no longer necessary based on a condition of the single-axle dynamically balanced robotic device 100 and a disengagement signal may be sent.

It should now be understood that a single-axle dynamically balanced robotic device may include a selectively actuated, non-backdrivable passive balancing system. The non-backdrivable passive balancing system can enable the single-axle dynamically balanced robotic device to temporarily reduce a balancing torque required to balance the single-axle dynamically balanced robotic device or to deactivate the dynamic balancing system completely in order to prevent unwanted or unnecessary use of on-board energy storage systems and/or excessive wear and tear on components. The non-backdrivable passive balancing system is selectively and/or automatically actuated between an engaged position and a disengaged position to passively or semi-passively balance the single-axle dynamically balanced robotic device. The non-backdrivable passive balancing system may include one or more interlocks for preventing the non-backdrivable passive balancing system from disengaging and requiring greater use or activation of the dynamic balancing system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A non-backdrivable passive balancing system for a single-axle dynamically balanced robotic device, the system comprising:
   a body comprising a distal end and a proximal end;
   a controller module; and
   an actuator communicatively coupled to the controller module of the single-axle dynamically balanced robotic device, the actuator coupled to the proximal end of the body via a linkage; wherein:

the actuator receives an engagement signal from the controller module, the engagement signal corresponding to an indication that the dynamically balanced robotic device is stationary, and the actuator causes the linkage to move the body from a disengaged position to an engaged position such that the distal end of the body contacts a ground surface and supports the dynamically balanced robotic device in a substantially upright position.

2. The system of claim 1, wherein the engagement signal further corresponds to a velocity of the single-axle dynamically balanced robotic device such that the actuator will not move the body from the disengaged position to the engaged position unless the velocity is below a threshold velocity value.

3. The system of claim 1, wherein the engagement signal further corresponds to an acceleration of the single-axle dynamically balanced robotic device such that the actuator will not move the body from the disengaged position to the engaged position unless the acceleration is below a threshold acceleration value.

4. The system of claim 1, wherein:
the controller module calculates a dynamic angle that is a difference between an actual orientation of the single-axle dynamically balanced robotic device and a robotic device true vertical orientation, and
the engagement signal further corresponds to the dynamic angle such that the actuator will not move the body from the disengaged position to the engaged position unless the dynamic angle is below a threshold dynamic angle value.

5. The system of claim 1, wherein:
the actuator receives a disengagement signal from the controller module, the disengagement signal corresponding to an indication that a dynamic balancing system of the single-axle dynamically balanced robotic device is capable of producing a dynamic torque to dynamically balance the single-axle dynamically balanced robotic device.

6. The system of claim 5, wherein:
the disengagement signal corresponds to one or more of a battery level, a battery capacity, and a battery use rate.

7. The system of claim 5, wherein:
the controller module is configured to calculate an expected battery use rate of the single-axle dynamically balanced device based at least on an expected battery use rate of the dynamic balancing system, and
the disengagement signal corresponds to the expected battery use rate.

8. The system of claim 1, wherein the body comprises an omnidirectional wheel at the distal end of the body.

9. The system of claim 8, wherein the omnidirectional wheel comprises at least two axes of rotation.

10. The system of claim 1, further comprising a second body, wherein:
the second body comprises a distal end and a proximal end;
a second actuator is coupled to the proximal end of the second body;
the second actuator is communicatively coupled to the controller module of the single-axle dynamically balanced robotic device, wherein:
the second actuator receives a second engagement signal from the controller module, the second engagement signal corresponding to an indication that the dynamically balanced robotic device is stationary, and
the second actuator causes the second body to move from a disengaged position to an engaged position such that the distal end of the second body contacts the ground surface and supports the dynamically balanced robotic device in the substantially upright position.

11. A dynamically balanced robotic device comprising:
one or more wheels rotatably coupled to a single axle;
a drive module coupled to the one or more wheels, the drive module directing movement of the one or more wheels;
a controller module communicatively coupled to the drive module, the controller module comprising a balance control sensor; and
a non-backdrivable passive balancing system comprising a body and an actuator, the actuator communicatively coupled to the controller module.

12. The device of claim 11, wherein the controller module, upon receiving a signal indicating that the dynamically balanced robotic device is stationary, transmits an engagement signal to the non-backdrivable passive balancing system to engage the body such that the body contacts a ground surface and supports the dynamically balanced robotic device in a substantially upright position.

13. The device of claim 11, wherein the controller module transmits an engagement signal when the velocity of the device is below a velocity threshold value and the acceleration of the device is below an acceleration threshold value.

14. The device of claim 11, wherein the controller module transmits an engagement signal when a current battery use rate indicates a reduction in the battery level below a threshold battery level before an engagement time.

15. The device of claim 11, wherein:
the controller module calculates a dynamic angle that is a difference between an actual orientation of the single-axle dynamically balanced robotic device and a robotic device true vertical orientation, and
the engagement signal further corresponds to the dynamic angle such that the actuator will not move the body from the disengaged position to the engaged position unless the dynamic angle is below a threshold dynamic angle value.

16. The device of claim 11, further comprising a second body, wherein:
the second body comprises a distal end and a proximal end;
a second actuator is coupled to the proximal end of the second body;
the second actuator is communicatively coupled to the controller module of the single-axle dynamically balanced robotic device, wherein:
the second actuator receives a second engagement signal from the controller module, the second engagement signal corresponding to an indication that the dynamically balanced robotic device is stationary, and
the second actuator causes the second body to move from a disengaged position to an engaged position such that the distal end of the second body contacts a ground surface and supports the dynamically balanced robotic device in a substantially upright position.

17. The device of claim 11, further comprising:
a robotic arm control module configured to extend and retract a robotic arm assembly from the single-axle dynamically balanced robotic device, wherein:
the robotic arm control module sends a robotic arm control signal to the controller module based on a state of the robotic arm assembly, and the one or more engagement criteria include the robotic arm control signal.

18. A single-axle dynamically balanced robotic device comprising:

one or more wheels rotatably coupled to a single axle;

a drive module coupled to the one or more wheels, the drive module directing movement of the one or more wheels;

a controller module communicatively coupled to the drive module, the controller module comprising a balance control sensor; and a non-backdrivable passive balancing system comprising a body and an actuator, the actuator communicatively coupled to the controller module, wherein:

when the single-axle dynamically balanced robotic device is in a stationary position, the controller module transmits an engagement signal to the actuator to:

move the body to an engaged position to contact a ground surface, and subsequently to transmit a deenergize signal to a dynamic balancing system to deenergize the one or more motors, and when the single-axle dynamically balanced robotic device is in a drivable position, the controller module transmits a disengagement signal to:

move the body to a disengaged position not in contact with the ground surface.

19. The single-axle dynamically balanced robotic device of claim 18, wherein:

the controller module calculates an engagement time and a battery expiration time, the engagement time defined as the amount of time required for the body to be moved from the disengaged position to the engaged position, and the battery expiration time defined as the amount of time remaining before the battery level is zero, wherein the non-backdrivable passive balancing system engages the body when the battery expiration time equals the engagement time.

20. The single-axle dynamically balanced robotic device of claim 19, wherein the controller module calculates an engagement time multiple and the non-backdrivable passive balancing system engages the body when the battery expiration time equals the engagement time multiple.

\* \* \* \* \*